United States Patent [19]

Spiero

[11] Patent Number: 5,029,007

[45] Date of Patent: Jul. 2, 1991

[54] COMBINATION OF A VIDEO TUNER, A VIDEO SIGNAL REPRODUCING ARRANGEMENT AND A PICTURE DISPLAY UNIT

[75] Inventor: Richard C. Spiero, Eindhoven, Netherlands

[73] Assignee: U.S. Philips Corporation, New York, N.Y.

[21] Appl. No.: 521,289

[22] Filed: May 7, 1990

[30] Foreign Application Priority Data

May 31, 1989 [NL] Netherlands .......................... 8901374

[51] Int. Cl.[5] ...................... H04N 5/268; H04N 11/20; H04N 7/01; H04N 5/50
[52] U.S. Cl. ....................................... 358/181; 358/11; 358/140; 358/191.1
[58] Field of Search .................... 358/181, 191.1, 141, 358/12, 140, 11, 142; 360/9.1, 61, 62; 334/47, 86

[56] References Cited

U.S. PATENT DOCUMENTS

| | | | |
|---|---|---|---|
| 4,303,940 | 12/1981 | Ciciora | 358/140 |
| 4,303,944 | 12/1981 | Kitamura | 358/191.1 |
| 4,488,180 | 12/1984 | Rabinowitz | 358/181 |
| 4,574,279 | 3/1986 | Roberts | 358/140 |
| 4,729,012 | 3/1988 | Jose et al. | 358/140 |
| 4,736,457 | 4/1988 | Kupfer | 334/47 |
| 4,831,446 | 5/1989 | Nakajima et al. | 358/181 |
| 4,864,421 | 9/1989 | Morioka et al. | 358/181 |
| 4,873,583 | 10/1989 | Kobayashi et al. | 360/61 |
| 4,901,148 | 2/1990 | Nakayama et al. | 358/140 |
| 4,931,855 | 6/1990 | Salvadorini | 358/142 |
| 4,963,991 | 10/1990 | Honjo | 360/9.1 |

*Primary Examiner*—James J. Groody
*Assistant Examiner*—Jeffrey S. Murrell
*Attorney, Agent, or Firm*—Edward W. Goodman

[57] ABSTRACT

A video tuner (1), a video signal (recording and) reproducing arrangement (7) and a picture display unit (35) are coupled to each other via a switching circuit (9). The video tuner (1) can supply first and second video signals on its output (3), representing pictures having a first and a second aspect ratio respectively (4:3 and 16:9, respectively). These signals can be recorded and reproduced by the video signal (recording and) reproducing arrangement (7) and can be displayed with the correct aspect ratio by the picture display unit (35). In order to realize this, a control signal line (55) is arranged between a control signal output (4) of the tuner (1), a control signal input and output terminal (10) of the video signal (recording and) reproducing arrangement (7) and control signal inputs (36) of the picture display unit and (46) of the switching circuit and control signal detector (9, 45). The video tuner (1) produces a first or a second control signal (S1 and S2) on the output (4) depending on the aspect ratio of the pictures in the supplied video signal while the video signal (recording and) reproducing arrangement (7) produces a third or a fourth control signal on the control signal input and output terminal (10) depending on the aspect ratio of the pictures in the video signal being reproduced. The switching circuit and detector (9, 45) select between the control signals in such a way that if the first or the second control signal is applied, the output signal of the video tuner (1) is selected, and if the third or the fourth control signal is applied, the output signal of the video signal (recording and) reproducing arrangement (7) is transferred to the picture display unit (35). The picture display unit (35) selects between the control signals in such a way that video signals applied to the input (37) are displayed with the correct aspect ratio on the display screen (39).

7 Claims, 2 Drawing Sheets

COMBINATION OF A VIDEO TUNER, A VIDEO SIGNAL REPRODUCING ARRANGEMENT AND A PICTURE DISPLAY UNIT

BACKGROUND OF THE INVENTION

1. Field of the Invention

The invention relates to a combination of a video tuner, a video signal reproducing arrangement and a picture display unit, the video tuner having a first output for supplying a video signal, the reproducing arrangement being constructed to read a video signal from a record carrier and to supply the video signal thus read to a first output, and the picture display unit having a first input for receiving a video signal, the combination further comprising switching means having a first signal input coupled to the first output of the video tuner, a second signal input coupled to the first output of the reproducing arrangement, having a signal output coupled to the first input of the picture display unit, and a control signal input, the switching means being constructed to establish a coupling between the first signal input and the signal output or between the second signal input and the signal output depending on a control signal applied to the control signal input. The invention also relates to a combination as defined above, in which the video signal reproducing arrangement is a video signal recording and reproducing arrangement, having a first input for receiving a video signal, which input is coupled to the first output of the video tuner.

The invention further relates to a video signal (recording and) reproducing arrangement and to a picture display unit for use in the combination, and to a television set comprising a video tuner, the picture display unit and the switching means of the combination.

2. Description of the Related Art

The combination comprising the video tuner, the video signal recording and reproducing arrangement and the picture display unit is known from Funk-Technik 38 (1983), Heft 5, pp. 208-212. This publication, in particular FIG. 1, shows a combination in which the video tuner, the switching means and the picture display unit have been combined to form a television set and in which the video signal recording and reproducing arrangement supplies a control signal for the switching means if a video signal reproduced by the arrangement is to be displayed on the screen of the picture display unit.

Also known are video tuners which are constructed to supply a first video signal representing pictures having a first aspect ratio or a second video signal representing pictures having a second aspect ratio. This first aspect ratio is for example 4:3, being the width-height ratio of the television pictures in existing television programs to be displayed on a standard display screen. The second aspect ratio is for example 16:9, being a width-height ratio which is more in conformity with movie technology and which is better adapted to motionpicture film and to the properties of the human eye.

An example of such a video tuner is the MAC decoder as described in Philips Technisch Tijdschrift 43, no. 8, Dec. 1986, pp. 213-229. The MAC decoder is employed for receiving satellite programs, the decoder deriving first or second video signals to be subsequently displayed with the correct aspect ratio on the display screen of the picture display unit.

SUMMARY OF THE INVENTION

It is an object of the invention to provide a combination of a video tuner, a video signal reproducing arrangement and a picture display unit, enabling first and second video signals to be reproduced with the correct aspect ratio on the picture display unit (display screen) either by means of the video tuner or by means of the reproducing arrangement, the picture display unit being capable of correctly selecting between the two signal sources.

It is another object of the invention to provide a combination of a video tuner, a video signal recording and reproducing arrangement and a picture display unit, enabling first and second video signals generated by the video tuner to be displayed directly on the picture display unit with the correct aspect ratio, enabling said video signals to be recorded on the recording and reproducing arrangement, enabling them to be subsequently displayed with the correct aspect ratio on the display unit, the picture display unit also being capable of correctly selecting between the two signal sources. For this purpose the combination in accordance with the invention, comprising the video signal reproducing arrangement, is characterized in that the video tuner is adapted to supply a first video signal representing pictures having a first aspect ratio, or a second video signal representing pictures having a second aspect ratio, to the first output, in that the video tuner further comprises a second output for supplying a first or a second control signal depending on whether the video signal to be supplied by the video tuner is a first or a second video signal, in that the reproducing arrangement is adapted to read a first or the second video signal from the record carrier and to supply the video signal thus read to the first output, in that the reproducing arrangement further comprises a second output for supplying a third or a fourth control signal depending on whether the video signal to be supplied by the arrangement is the first or the second video signal, in that the reproducing arrangement is further adapted to read from the record carrier a first or a second auxiliary signal which is characteristic of the first or the second video signal recorded on the record carrier and, under the influence of the auxiliary signal thus read, to derive the third or the fourth control signal and to supply the control signal to the second output, in that the second output of the video tuner and the second output of the reproducing arrangement are coupled both to the control signal input of the switching means and to a second input of the picture display unit, in that the switching means are adapted to establish a coupling between the first signal input and the signal output when the first or the second control signal is applied to the control signal input, and to establish a coupling between the second signal input and the signal output when the third or the fourth control signal is applied to the control signal input, and in that the picture display unit is adapted to display the first video signal applied to its first input with the first aspect ratio on a display screen upon reception of the first or the third control signal applied to its second input and is adapted to display the second video signal applied to its first input with the second aspect ratio upon reception of the second or the fourth control signal applied to its second input. For said purpose, the combination in accordance with the invention, comprising the video signal recording and reproducing arrangement is further characterized in that the recording and reproducing arrangement is adapted to record the first or the second video signal applied to its first input on the record carrier and has a second input for receiving the first or the second control signal, which second input is coupled to the second output of the video tuner, in that the recording and reproducing arrangement is further adapted to record the first or the second auxiliary signal on the record carrier depending on the first or the second control signal applied to the second input, and in that the second output and the second input of the recording and reproducing arrangement are combined to form a single input-output terminal. In order to ensure that the first or the second video signals supplied by the decoder are displayed correctly by the picture display unit, the video signals supplied to the picture display unit by the decoder should be accompanied with an indication whether the signals applied to the first input of the picture display unit are first or second video signals. Similarly, the video signal reproducing arrangement can supply first and second video signals to the picture display unit. Again the video signals applied to the picture display unit should be provided with an indication to specify the type of the video signals, enabling the video signals supplied by the reproducing arrangement to be displayed with the correct aspect ratio on the display screen. Moreover, the picture display unit should be capable of detecting which source, the video tuner or the reproducing arrangement, supplies video signals with their associated identifications to the picture display unit, to enable it to be changed over to the correct source with the aid of the switching means. In particular, since the second input and the second output of the recording and reproducing arrangement have been combined in this arrangement, steps are needed to ensure that the picture display unit and the switching means correctly receive the information indicating the aspect ratio of the video signal supplied to the picture display unit by the video tuner and the recording and reproducing arrangement and the information indicating the source supplying the video signal. The invention is based on the recognition of the fact that it is possible to provide all this information via a single electrical line. By means of this single electrical line, a coupling is established between the video tuner, on the one hand, and the switching means and the picture display unit, on the other hand, and between the video tuner and the (recording and) reproducing arrangement as well as between the (recording/)reproducing arrangement, on the one hand, and the switching means and the picture display unit, on the other hand, via which coupling the information transfer of the control signal can be realized. For the picture display unit, it is then important that it is capable of selecting between the first and the third control signal, on the one hand, and the second and the fourth control signal, on the other hand, so that the picture display unit can detect the aspect ratio of the pictures in the video signal applied to its first input. For the switching means, it is important that it is capable of selecting between the first and the second control signal, on the one hand, and the third and the fourth control signal, on the other hand, so that the switching means can identify the source supplying the video signals.

Particularly in the case that the video tuner, the picture display unit and the switching means are combined in a television set, the electrical connection between this television set and the recording and reproducing arrangement, for example a video recorder, can be realized by means of a SCART cable, which is known per se. To transfer the four control signals, use can be made of line 8 in the SCART cable. For a publication on the SCART cable, reference is made to the afore-mentioned article in Funk-Technik. The first, the second, the third and the fourth control signal are then preferably direct voltage signals having d.c. values within a first, a second, a third and a fourth voltage range, which four voltage ranges do not overlap each other.

For the first and the third voltage ranges the voltage ranges of 0–2 V and 9.5–12 V already defined in the present SCART standard may be used, see Table 1 in the Funk-Technik article. In accordance with the present SCART standard, a control signal in the voltage range from 0–2 V indicates that a normal television signal is applied to the picture display unit via the video tuner. In accordance with the current SCART standard, a control signal in the voltage range from 9.5–12 V indicates that an external source, such as a video recorder, supplies a video signal to the picture display unit.

The change over point for the switching means is situated at approximately 5.5 V. Consequently, when the recording and reproducing arrangement (video recorder) supplies a control signal of a value larger than 5.5 V to the control signal input of the switching means, the switching means connect the first output of the recording and reproducing arrangement to the first input of the picture display unit. When a control signal of a value smaller than 5.5 V is applied to the control signal input of the switching means, the switching means change over to connect the first output of the video tuner to the first input of the picture display unit. If now two intermediate voltage ranges are added to the existing standard, the second voltage range being selected between for example 4 and 5 V and the fourth voltage range between for example 6 and 7 V, this enables a parameter which is characteristic of the aspect ratio of the pictures in the video signal to be transmitted with the source selection control signal. In this respect, it is to be noted that the recording and reproducing arrangement has converted the first or second control signal associated with a video signal and applied to the arrangement during recording into a third or a fourth control signal during subsequent reproduction.

BRIEF DESCRIPTION OF THE DRAWINGS

The invention will now be described in more detail, by way of example; with reference to the Figures. In the Figures.

DESCRIPTION OF THE PREFERRED EMBODIMENTS

Figure 1:
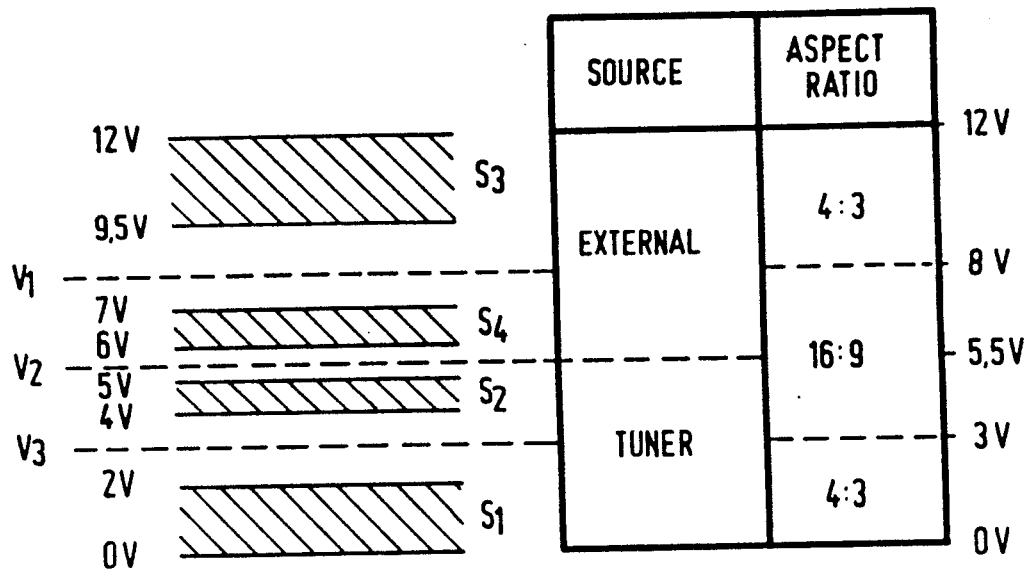
FIG. 1 shows and example of the four control signals.
Figure 2:
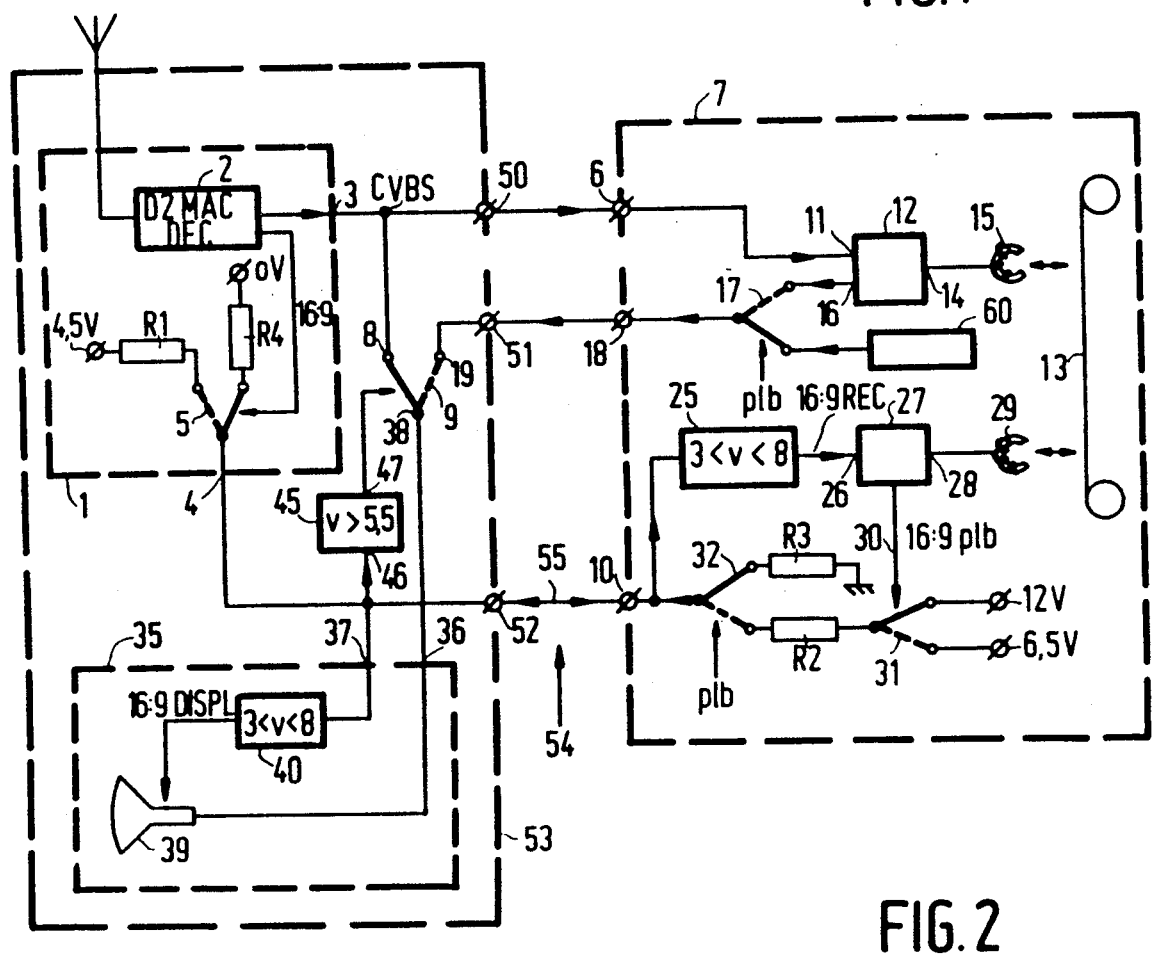
FIG. 2 shows a first embodiment of the combinations.

The combination shown in FIG. 2 comprises a video tuner 1, for example equipped with a D2 MAC decoder 2. The tuner 1 has a first output 3 and a second output 4. The first or second video signals are supplied via the output 3. The first video signals are made up of pictures having an aspect ratio of 4:3. The second video signals are made up of pictures having an aspect ratio of 16:9. The D2 MAC decoder receives D2 MAC signals and converts these video signal into CVBS (chroma-video-blanking-sync) signals. The aspect-ratio information is contained in the D2 MAC signals themselves. The tuner 1 extracts this information from the D2 MAC signal and, depending on whether the aspect ratio of the pictures in the video signals is 4:3 or 16:9, the tuner 1 supplies a first control signal S1 or a second control signal S2 to its output 4. In the present example the first control signal S1 is a direct voltage signal having a d.c. amplitude in the voltage range from 0 V to 2 V, see FIG. 1. In the present example S1 is 0 V. The second control signal S2 is also a direct voltage signal having a d.c. amplitude in the voltage range from 4 V to 5 V, see FIG. 1. In the present example S2 is 4.5 V. For this purpose, the tuner 1 comprises a switch 5 which is controlled by a switching signal generated by the D2 MAC decoder 2, which switching signal in fact indicates whether the pictures in the video signal supplied by the decoder 2 have an aspect ratio of 4:3 or 16:9. In the first mentioned case, the decoder 2 supplies such a switching signal to the switch 5, that this switch is in the position shown. The direct voltage on the output 4 is then 0 V. In the other case, the decoder 2 supplies such a control signal that the switch 5 occupies the other position. The input 4 is then coupled to a direct voltage point at 4.5 V via the resistor R1 of, for example 1, kohm. Now a direct voltage of 4.5 V appears on the output 4. The output 3 of the tuner 1 is coupled to a first input 6 of a recording and reproducing arrangement 7 and to a first input 8 of switching means 9. The output 4 of the tuner 1 is coupled to a second input 10 of the arrangement 7. The input 6 is coupled to an input 11 of a read-write unit 12, in which the video signals are processed in such a way that they can be recorded on the record carrier 13.

Since in the present case the record carrier 13 takes the form of a magnetic tape, the video signal processed by the unit 12 is applied to a read-write head 15 via the output 14 to record the video information on the record carrier 13. Recording can be effected in adjacent tracks which are inclined relative to the longitudinal direction of the record carrier 13. Such an arrangement is referred to as a helical-scan video recorder. The read-write unit 12 can also read the video information by means of the read-write head 15, the information thus read being supplied to an output 16. During reproduction, the switch 17 is set to the position not shown under the influence of a switching signal plb. As a result of this, the output 16 is coupled to a first output 18 of the arrangement 7 via the switch 17. The output 18 is coupled to a second input 19 of the switching means 9.

The input 10 is coupled to an input 26 of a read-write unit 27 via a detector 25. The output 28 of this unit 27 is coupled to a read-write head 29 or to the read-write head 15.

If a video signal generated by the tuner 1 is recorded on the record carrier, the first or the second control signal is also applied to the arrangement 7 via the input 10. For this purpose, an auxiliary signal which is characteristic of the aspect ratio should also be recorded on the record carrier 13. The detector 25 can now discriminate between the first and the second control signal applied to the terminal 10. For this purpose, the detector 25 comprises a comparator (not shown) having a threshold value V3, see FIG. 1, which threshold value is 3 V in the present example. Depending on which control signal (the first or the second) is applied to the terminal 10, a first or a second auxiliary signal is recorded on the record carrier, together with the associated video signal, by means of the read-write unit 27 and, as the case may be, the read-write head 29. This auxiliary signal may be recorded in a servo track already present on the record carrier, which servo track is situated at the edge of the record carrier and extends in the longitudinal direction of the record carrier. During reproduction, the first or the second auxiliary signal is read and by means of the unit 27 it is applied to the switch 31 as a switching signal via the line 30. If the first auxiliary signal is read, the switch 31 is in the position shown. If the second auxiliary signal is read, the switch 31 is in the other position. Since during reproduction the switch 32 is set to the position not shown under the influence of the switching signal plb, a third control signal S3 is applied to the terminal 10 in the first mentioned case (the first auxiliary signal is read). The third control signal S3 is for example a direct voltage signal having a d.c. amplitude in a voltage range between 9.5 V and 12 V, see FIG. 1. FIG. 2 shows that S3 is 12 V. In the other case, a fourth control signal S4 is applied to the terminal 10. The control signal S4 is also a direct voltage signal and lies in a voltage range between 6 V and 7 V.

FIG. 2 shows that the detector 25 also comprises a second comparator (not shown) having a threshold value V1 of 8 V. This comparator is essential in the case that the signal is copied from one video recorder to another video recorder and the correct information about the aspect ratios should also be copied.

FIG. 2 shows that S4 is 6.5 V. The resistance value of R2 may be, for example, 330 Ω. Preferably, the resistance value of the R3 is selected to be larger than 8 kΩ. The arrangement 7 may further comprise an internal tuner 60 which is adapted to receive normal video signals with pictures having an aspect ratio of 4:3. For this purpose the switch 17 is always connected to the tuner 60, unless the arrangement is set to reproduction. In that case the output 16 is coupled to the terminal 18.

The combination further comprises a picture display unit 35 having a first input 36 and a second input 37. The second output 4 of the tuner 1 and the terminal 10 of the arrangement 7 are both coupled to the input 37 of the unit 35. An output 38 of the switching means 9 is coupled to the input 36 of the unit 35. Video signals representing pictures having an aspect ratio of 4:3 or 16:9 applied to the input 36, are displayed on the display tube 39 of the unit 35.

In order to enable the pictures in the video signals to be reproduced with the correct aspect ratio, the unit 35 further comprises a detector 40. The detector 40 comprises two comparators (not shown) having threshold values V3=3 V and V1=8 V. If a control signal applied to the detector 40 is situated in the voltage range between 3 and 8 V the signal will be a video signal representing pictures having an aspect ratio of 16:9 and applied to the input 36. If the control signal applied to the detector 40 is situated outside the range from 3 to 8 V the video signal applied to the input 36 represents pictures having an aspect ratio of 4:3. The detector 40 generates auxiliary signals characteristic of each case to drive the display screen in such a way that in each case the pictures in the video signal can be displayed on the screen 39 with the correct aspect ratio. This means that if the television set has a display screen having an aspect ratio of 4:3, pictures in a video signal having an aspect ratio of 4:3 will exactly fill the screen. Pictures in a video signal having an aspect ratio of 16:9 will be reproduced with a picture with equal to the width of the display screen but with a height which is smaller than the height of the display screen. This means that a black horizontal band will be formed at the top and the bottom of the picture. In the case of a picture screen having an aspect ratio of 16:9, pictures in a video signal having an aspect ratio of 16:9 will exactly fill the screen. Pictures in a video signal having an aspect ratio of 4:3 will have a picture height equal to the height of the picture screen. The width is smaller than the width of the screen. Consequently, a black vertical band will be formed at both sides of the picture.

The combination further comprises a detector 45 having an input 46, coupled to the input 4, and having an output 47. The detector 45 comprises a comparator (not shown) having a threshold value V2 of 5.5 V. If a control signal having a voltage value smaller than 5.5 V is applied to the input 41 the detector 45 will supply such a switching signal to the switching means 9 via its output 47 that said switching means are set to the position shown. If a control signal having a voltage value larger than 5.5 V is applied to the input 46, the detector 45 will supply a switching signal to set the switching means 9 to the other position not shown.

The combination operates as follows. The D2 MAC decoder 2 generates a video signal having pictures with an aspect ratio of 4:3 or 16:9. This video signal should be displayed by means of the picture display unit 35. The tuner 1 supplies the video signal to the terminal 8 of the switching means 9 via the output 3. Moreover, a first control signal (S1=0 V because the switch 5 and the switch 32 are in the position shown and because of the coupling to ground via the resistor R4, whose resistance value is 4 kΩ or higher) or a second control signal (S2=4.5 V, because the switch 5 is in under the position not shown) is generated on the output 4. The first or the second control signal is applied to the detector 45 of the switching means 9 and to the detector 40 of the picture display unit 35. The control signals S1 and S2 both ensure that the switching means 9 are set to the position shown, so that the video signal is applied to the input 36 of the picture display unit 35. Depending on whether the control signal applied to the detector 40 is a first (S1) or a second (S2) control signal, the picture display unit 36 will display the pictures in the applied video signal on the display screen 39 with an aspect ratio of 4:3 of 16:9.

Now the video signal generated by the D2 MAC decoder 2 should be recorded on the record carrier 13 in the recording and reproducing arrangement 7. The video signal is normally applied to the input 11 of the read-write unit 12 via the terminals 3 and 6 and is recorded on the record carrier 13 by means of the head 15. The first or the second control signal is applied to the detector 25 via the terminal 10. Depending on the aspect ratio (4:3 or 16:9), the read-write unit 27 and the head 29 record a first or a second auxiliary signal on the record carrier.

Subsequently, the video signal is reproduced by the arrangement 7 and is applied to the picture display unit 35 to display the video signal on the screen 39. The video signal reproduced by the arrangement 7 is applied to the input 19 of the switching means 9 via the output 18. The first or the second auxiliary signal read from the record carrier causes the switch 31 to be set to the position shown or the position not shown, respectively. If the video signal applied to the output 18 is a video signal having pictures with an aspect ratio of 4:3, a third control signal S3 (=12 V) is produced on the terminal 10. In the case of an aspect ratio of 16:9, a fourth control signal S4 (=6.5 V) is generated on the terminal 10. This control signal, which is applied to the detector 45, causes the switching means 9 to change over to the other position, so that the video signals are applied from the arrangement 7 to the input 36 of the picture display unit 35. Since the detector 40 can discriminate between the third and the fourth control signal, the pictures in the video signal applied to the picture display unit 35 are displayed with the correct aspect ratio on the screen 39.

The tuner 2, the picture display unit 35, the detector 45 and the switching means 9 may form part of a television set 53. In that case the set comprises three terminals 50, 51, 52 which are coupled to the output 3 of the tuner 1, the terminal 19 of the switching means 9 and the output 4 of the tuner 1, respectively. The connection between the television set 53 and the arrangement (video recorder) 7 can then be established by means of a SCART cable (also referred to as EURO cable) 54. The terminals 10 and 52 of the arrangement 7 and the set 53 are then coupled to the pins 8 of the SCART (EURO) connectors at both ends of this cable and to each other via the line 55 in this SCART (EURO) cable.

Figure 3:
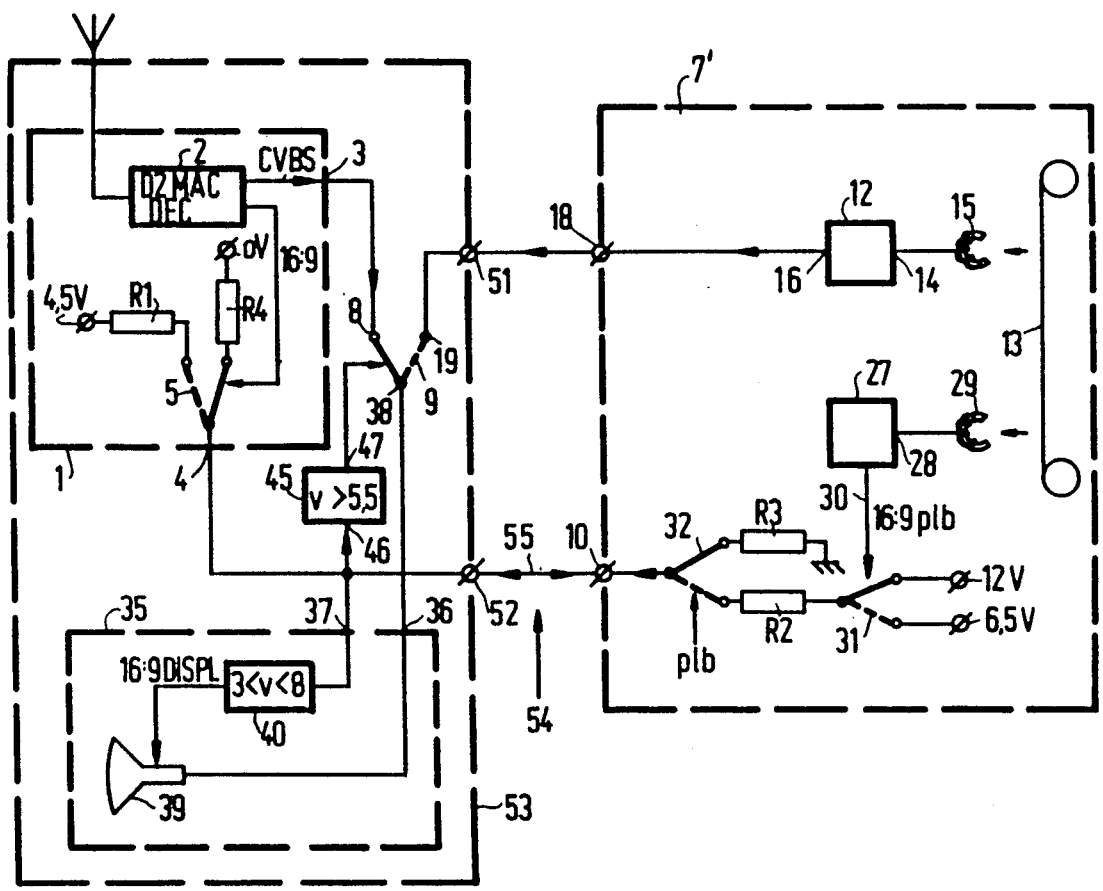
FIG. 3 shows a second embodiment of the combination.

FIG. 3 shows another combination. The combination bears much resemblance to that shown in FIG. 2. The tuner 1, the switching means 9 and the picture display unit 35 in the combination shown in FIG. 3 are the same as those shown in FIG. 2. Instead of a recording and reproducing arrangement the combination shown in FIG. 3 comprises a reproducing arrangement 7'. The reproducing arrangement 7' is constructed as a magnetic-tape playback arrangement. However, this is not necessary. Alternatively, the reproducing arrangement 7' may be, for example, a CD video (CDV) player, a CD interactive (CDI) player, or a Laservision player. A characteristic feature is that such players have an output 10 for supplying the third or the fourth control signal, depending on whether a first or a second video signal appears on the output 18.

It is to be noted that the invention is not limited to the embodiments disclosed herein. For example, the invention also applies to those embodiments which differ from the embodiments shown in respects which are not relevant to the invention. For example, the four control signals transferred via the control signal line 55 may be of a different type. Such control signals may be, for example, frequency-multiplexed. Moreover, it is not necessary to employ an HD MAC decoder in the tuner 1. Another possibility may be, for example, a decoder for MUSE signals.

I claim:

1. A combination of a video tuner, a video signal reproducing arrangement and a picture display unit, the video reproducing arrangement and a picture display unit, the video tuner having a first tuner output for supplying a tuner video signal, the reproducing arrangement being constructed to read a reproduced video signal from a record carrier and to supply the reproduced video signal thus read to a first output, and the picture display unit having a first input for receiving an applied video signal, the combination further comprising switching means having a first signal input coupled to the first tuner output of the video tuner, a second signal input coupled to the first output of the reproducing arrangement, a signal output coupled to the first input of the picture display unit, and a control signal input, the switching means being constructed to selectively establish a coupling between one of the first and second signal inputs and the signal output depending on a control signal applied to the control signal input, characterized in that the video tuner is adapted to alternatively supply to the first tuner output, a first tuner video signal representing pictures having a first aspect ratio, and a second tuner video signal representing pictures having a second aspect ratio, the video tuner further comprising a second tuner output and means for supplying at said second tuner output a first control signal when the video signal at said first tuner output is said first tuner video signal, and a second control signal when the video signal at said first tuner output is said second tuner video signal; said reproducing arrangement being adapted to read a first reproduced video signal representing pictures having said first aspect ratio, and a second reproduced video signal representing pictures having said second aspect ratio, said reproducing arrangement further comprising a second output and means for supplying to said second output a third control signal when the video signal read by said reproducing arrangement is said first reproduced video signal, and a fourth control signal when the video signal read by said reproducing arrangement is said second reproduced video signal, wherein said means for supplying said third and fourth control signals receives a first and a second auxiliary signal, respectively, read from the record carrier denoting the aspect ratios of said first and second reproduced video signals, respectively; and the second tuner output and the second output of the reproducing arrangement being both coupled to the control signal input of the switching means and to a second input of the picture display unit, wherein the switching means couples the first signal input to the signal output upon receipt of either one of said first and second control signals, and couples the second signal input to the signal output upon receipt of either one of said third and fourth control signals, and wherein the picture display unit displays said first tuner video signal with said first aspect ratio upon receipt of said first control signal, said second tuner video signal with said second aspect ratio upon receipt of said second control signal, said first reproduced video signal with said first aspect ratio upon receipt of said third control signal, and said second reproduced video signal with said second aspect ratio upon receipt of said fourth control signal.

2. A combination as claimed in claim 1, wherein the video signal reproducing arrangement is a video signal recording and reproducing arrangement having a first input coupled to the first tuner output of said video tuner for receiving the tuner video signal, characterized in that said video signal recording and reproducing arrangement further comprises a second input coupled to the second tuner output and is adapted to record the first tuner video signal upon receipt of said first control signal, and the second tuner video signal upon receipt of said second control signal, said video signal recording and reproducing arrangement further comprising means for recording the first auxiliary signal upon receipt of said first control signal and for recording the second auxiliary signal upon receipt of said second control signal, wherein said second input and said second output of said video signal recording and reproducing arrangement are combined to form a single input-output terminal.

3. A combination as claimed in claim 1 or 2, characterized in that the switching means further comprise a detector unit having an input coupled to the second tuner output of the video tuner and to the second output of the reproducing arrangement and having an output coupled to the control-signal input of the switching means, the switching means and the detector unit being constructed in such a way that, when either one of the first and the second control signals is applied to the input of the detector unit, said detector unit supplies a control signal to the control signal input of the switching means causing the switching means to establish a coupling between the first signal input and the signal output, and when either one of the third and the fourth control signals is applied to the input of the detector unit, said detector unit supplies a further control signal to the control signal input of the switching means causing the switching means to establish a coupling between the second signal input and the signal output.

4. A combination as claimed in claim 1 or 2 characterized in that the picture display unit further comprises a detector unit having an input coupled to the second turner output and to the second output of the reproducing arrangement, and having an output coupled to the second input of the picture display unit, wherein the detector unit is responsive to either one of the first and the third control signals applied to its input to supply a control signal to the second input of the picture display unit causing the picture display unit to be adapted to display the applied video signal with the first aspect ratio on the display screen, and the detector unit is responsive to either one of the second and the fourth control signals applied to its input to supply a further control signal to the second input of the picture display unit causing the picture display unit to be adapted to display the applied video signal with the second aspect ratio on the display screen.

5. A combination as claimed in claim 1, characterized in that the first, the second, the third and the fourth control signals are direct voltage signals whose d.c. values are situated in a first, a second, a third and a fourth direct voltage range, respectively, wherein said first, second, third and fourth direct voltage ranges do not overlap one another.

6. A television set comprising the video tuner, the picture display unit and the switching means of the combination as claimed in display unit and the switching means of the combination as claimed in claim 1, characterized in that the television set comprises a first and a second input terminal and a first and a second output terminal, the first tuner output of the video tuner being coupled to the first output terminal, the first input terminal being coupled to the second input of the switching means, the second tuner output of the video tuner being coupled to the second output terminal, and the second input terminal being coupled to the second input of the picture display unit, and wherein the second output terminal and the second input terminal are combined to form a single input-output terminal.

7. A recording and reproducing arrangement for use in a combination as claimed in claim 2, characterized in that the input-output terminal is coupled to an input of a detector unit, and in that during recording, the detector unit is responsive to one of the first and the third control signals received on its output to record the first auxiliary signal on the record carrier, and is responsive to one of the second and the fourth control signals received on its input to record the second auxiliary signal on the record carrier.

* * * * *